United States Patent
Kolquist et al.

(10) Patent No.: US 11,653,801 B2
(45) Date of Patent: May 23, 2023

(54) VEHICLE FLOOR MAT VACUUM MACHINE

(71) Applicants: Jon P. Kolquist, Royal Palm Beach, FL (US); Derek Kolquist, Royal Palm Beach, FL (US)

(72) Inventors: Jon P. Kolquist, Royal Palm Beach, FL (US); Derek Kolquist, Royal Palm Beach, FL (US)

( * ) Notice: Subject to any disclaimer, the term of this patent is extended or adjusted under 35 U.S.C. 154(b) by 152 days.

(21) Appl. No.: 16/892,940

(22) Filed: Jun. 4, 2020

(65) Prior Publication Data

US 2021/0378466 A1    Dec. 9, 2021

(51) Int. Cl.
*A47L 7/00*      (2006.01)
*A47L 9/04*      (2006.01)
*A47L 9/28*      (2006.01)

(52) U.S. Cl.
CPC .......... *A47L 7/0047* (2013.01); *A47L 9/0411* (2013.01); *A47L 9/0477* (2013.01); *A47L 9/2842* (2013.01); *A47L 9/2847* (2013.01)

(58) Field of Classification Search
CPC .......... A47L 11/00; A47L 23/266; A47L 5/38; A47L 3/772; A47L 3/732; A47L 4/268; A47L 4/929; A47L 8/286; A47L 8/292
USPC ....... 15/40, 77, 88.3, 303, 306.1, 308, 309.2
See application file for complete search history.

(56) References Cited

U.S. PATENT DOCUMENTS

| | | | | | |
|---|---|---|---|---|---|
| 3,772,732 | A | * | 11/1973 | Gilmore | D06G 1/00 15/422.2 |
| 6,102,054 | A | * | 8/2000 | Diaz | B08B 3/02 134/57 R |
| 7,624,471 | B2 | * | 12/2009 | Bae | B08B 5/043 15/312.1 |
| 2014/0020723 | A1 | * | 1/2014 | Murphy | B08B 3/022 134/104.2 |

* cited by examiner

*Primary Examiner* — Don M Anderson
*Assistant Examiner* — Sarah Akyaa Fordjour
(74) *Attorney, Agent, or Firm* — Malloy & Malloy, P.L.; Robert M. Downey

(57) ABSTRACT

A vehicle floor mat vacuum machine includes an elongate open mouth communicating with an interior chamber for passage of a floor mat therethrough and between an upper feed roller and a lower brush roller for contacting a carpet surface of the floor mat. A vacuum source connects to a vacuum manifold to create suction, as the brush roller and suction force work in conjunction to remove sand, dirt and other debris from the floor mat. An electric motor, drive belt and reduction gear assembly rotate the feed roller and brush roller in opposite directions with the brush roller rotating at a significantly higher speed. In one embodiment, the vacuum source is a central vacuum system, wherein a solenoid-controlled valve in the vacuum line extending from the feed roller is opened for a timed sequence during operation of the machine.

8 Claims, 5 Drawing Sheets

VEHICLE FLOOR MAT VACUUM MACHINE

BACKGROUND OF THE INVENTION

Field of the Invention

This invention relates generally to automated vacuum machines and, more particularly, to an automated vehicle floor mat vacuum machine that simultaneously brushes and vacuums floor mats through a timed sequence.

DESCRIPTION OF THE RELATED ART

Most vehicles, including passenger vehicles and trucks, use floor mats to protect the underlying carpeted surface in the vehicle. While some floor mats are made entirely of a rubber material and can be easily cleaned by rinsing them under a hose, many vehicle floor mats have a carpet type surface that holds sand, dirt and other debris and which needs to be vacuumed on a periodic basis. Most service stations and car washes have vacuum machines that allow for vacuuming of interior of vehicles including vehicle floor mats. Typically, these vacuum machines include a flexible hose and a nozzle that is shaped to be moved over the carpeted surfaces in a vehicle including the floor mats by manual operation. Normally, the floor mats are removed from the vehicle and the nozzle on the end of the hose is moved over the floor mat while the floor mat is held or placed on a rack or on the ground surface. This process of vacuuming floor mats with a handheld nozzle on the end of a hose is time consuming and can slow down the process of cleaning vehicles, particularly at a carwash. While some carwashes do have self-service vacuum stations, with a number of independent vacuum hoses for use by patrons, they still require the time-consuming task of removing the floor mats and vacuuming each floor mat by hand.

Accordingly, there remains a need for an automated floor mat vacuum machine that allows the user to simply feed the floor mats through the automated machine wherein the floor mats are brushed and vacuumed in an automated process and then deposited in a collection bin where the user can then retrieve the floor mats and simply place them back in their vehicle with minimal effort and in a short period of time.

SUMMARY OF THE INVENTION

The present invention is directed to a vehicle floor mat vacuum machine for automatically vacuuming and cleaning floor mats, particularly at a car wash or service station. The floor mat vacuum machine includes an overall housing structure with an upper housing portion and a vertically extending side housing portion. The upper housing portion surrounds an interior mat vacuum chamber and includes a horizontal elongate slot opening defining an open mouth for receiving a vehicle floor mat therethrough. The open mouth communicates with the interior floor mat vacuum chamber. A feed roller and a brush roller are rotatably supported within the interior vacuum chamber and are positioned in spaced parallel relation, with a gap between the feed roller and brush roller for passage of the floor mat therebetween. The brush roller is supported within a vacuum manifold having an elongate trough that is open at the top. The vacuum manifold connects to a vacuum hose that leads to a vacuum source. In one embodiment, the vacuum source is a central vacuum system. The central vacuum system may be at a car wash facility that has multiple vacuum stations all connected to the central vacuum system. In another embodiment, the vacuum source is a standalone vacuum device that may be contained within the vertical side housing of the floor mat vacuum machine. In either embodiment, the vacuum source provides a source of suction at the vacuum manifold, and particularly along the open top of the elongate trough.

An electric motor and drive belt and pully system, along with a reduction gear assembly drives rotation of the feed roller and the brush roller in opposite directions and with the brush roller rotating at a significantly higher speed relative to the feed roller. A timer control circuit controls the period of time of operation of the machine, and particularly rotation of the rollers, upon operation of a start button. In the one embodiment, wherein the vacuum source is a central vacuum system, a solenoid-controlled valve is provided in the vacuum hose connection extending from the vacuum manifold. The solenoid-controlled valve is opened during the timed sequence of operation of the machine, to allow for a force of suction from the central vacuum system to be open to the vacuum manifold surrounding the brush roller within the interior mat vacuum chamber. At the end of the timed sequence of operation, the solenoid-controlled valve closes simultaneously with the stopping of rotation of the feed roller and brush roller. In another embodiment, wherein the vacuum source is a self-contained vacuum device that may be installed within the housing of the floor mat vacuum machine, the timer control switch operates the vacuum device simultaneously with rotation of the brush roller and feed roller through the timed sequence of operation after pressing the start button on the machine. At the end of the timed sequence, power to the standalone vacuum device is interrupted to thereby stop the vacuum simultaneous with the stopping of the rotation of the brush roller and feed roller.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENTS

Figure 1:
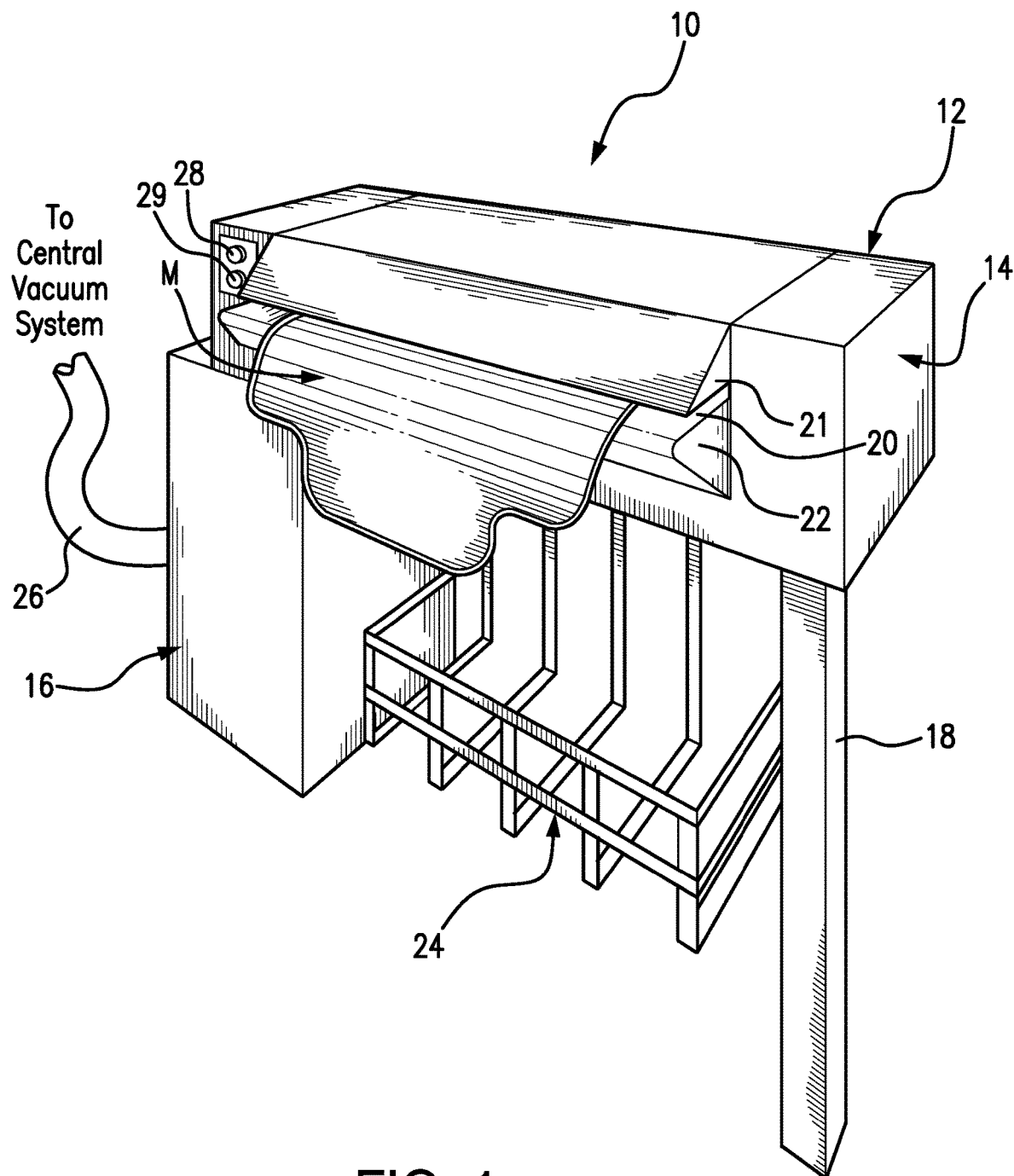
FIG. 1 is a front perspective view of the vehicle floor mat vacuum machine of the present invention.

Referring to the several views of the drawings, and initially FIG. 1, the vehicle floor mat vacuum machine of the present invention is shown and is generally indicated as 10.

Figure 3:
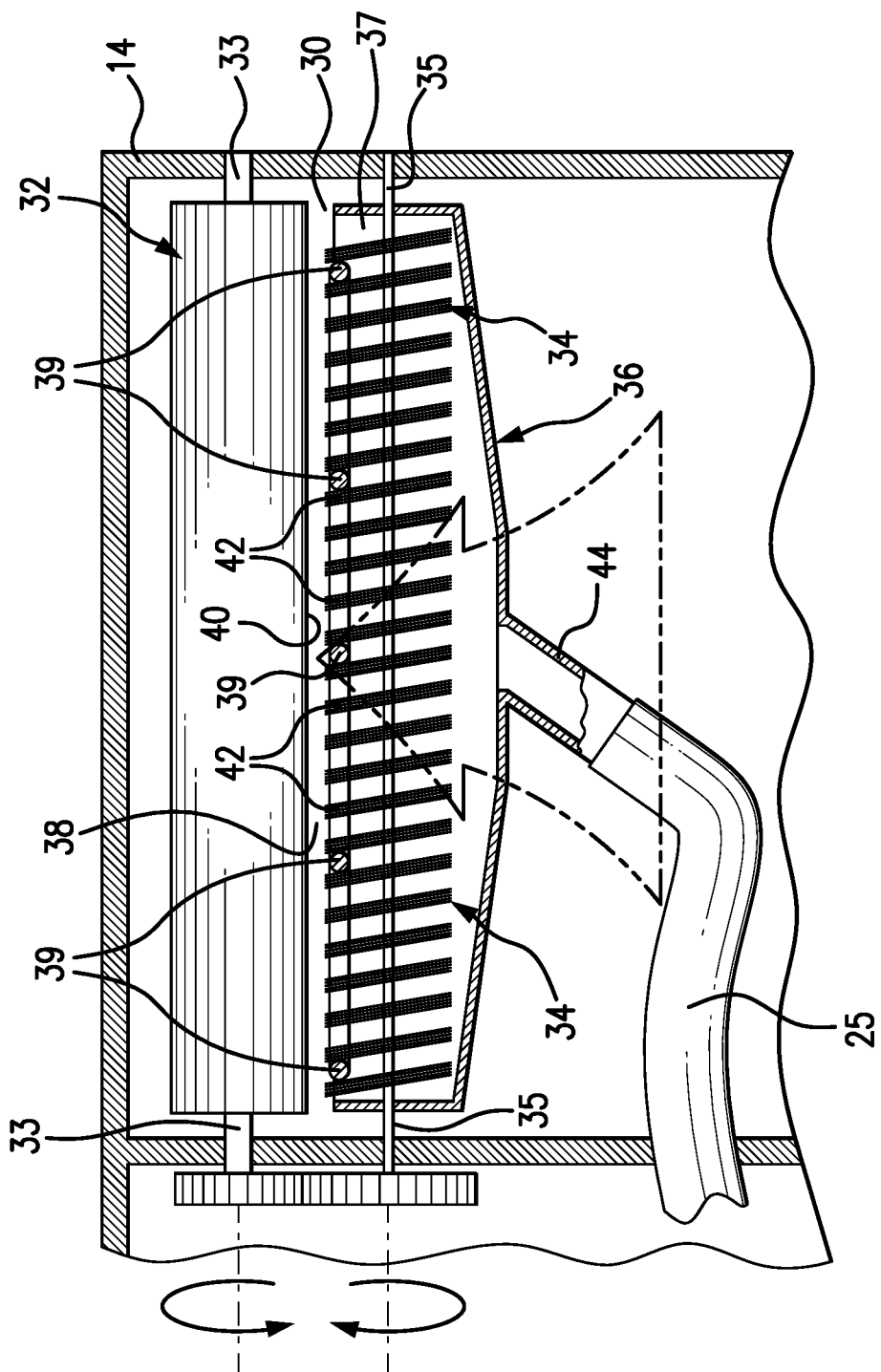
FIG. 3 is an isolated view, shown in cut-away, and in partial cross section, illustrating a feed roller, brush roller and vacuum manifold within an interior mat vacuum chamber of the machine.

As seen in FIG. 1, the vehicle floor mat vacuum machine 10 includes an overall housing structure 12 including an upper housing portion 14 that is supported horizontally by a vertical side housing portion 16 and at least one support leg 18 at the opposite end of the upper housing portion 14. The floor mat vacuum machine 10 is specifically structured for the automated vacuuming and cleaning of vehicle floor mats. As seen in FIG. 1, the machine includes an open longitudinal slot 20 defining a mouth for receiving a floor mat M therethrough and between an upper lip structure 21 and a lower lip structure 22 surrounding the open slot 20. The open slot 20 through which the floor mat M is inserted communicates with an interior mat vacuum chamber 30, as shown in FIG. 3. The floor mat vacuum machine 10 connects with a vacuum source, such as a central vacuum system or a self-contained vacuum unit, as described more fully hereinafter. The embodiment shown in FIG. 1 shows the vacuum hose 26 leading to the central vacuum system. Operation of the floor mat vacuum machine through a timed sequence is started by pushing a start button 28 on the front of the machine. An emergency stop switch 29 is also provided to interrupt operation.

Referring to FIG. 3, the interior mat vacuum chamber 30 is contained within the upper housing portion 14 and communicates with the open slotted mouth 20 shown in FIG. 1. Within the interior mat vacuum chamber 30, there is a rotatable feed roller 32 and a rotatable brush roller 34. The feed roller 32 rotates on axle 33, while the brush roller rotates on axle 35. The brush roller 34 is partially surrounded by a vacuum manifold 36 that includes an elongate open trough 37 extending beyond the length of the brush roller bristles 42. The axles 33 and 35 of the feed roller and brush roller are maintained in parallel relation so that the feed roller 32 and the brush roller 34 are maintained in parallel, horizontally extending relationship to one another with a gap 38 between a lowermost cylindrical surface 40 of the feed roller and an uppermost portion of the brush roller bristles 42. The gap 38 is specifically sized to accommodate passage of the vehicle floor mat therethrough, between the feed roller 32 and the brush roller 36 with the ends of the bristles 42 making contact with a carpet surface of the floor mat as the floor mat passes through the gap 38. Contact of the rotating feed roller 32 with the bottom surface of the inverted floor mat M (see FIG. 1), along with contact of the rotating brush roller with the top carpet side of the floor mat serves to pull the floor mat through the machine. Transverse bars 39 extend across the open top of the trough 37 of the vacuum manifold 36 and are positioned slightly below the bristle ends 42 of the brush roller 34. The transverse bars 39 discourage the floor mat from being sucked down into the vacuum manifold 36 by a force of suction of a vacuum source that is connected to the vacuum manifold 36. The vacuum manifold 36 includes a tubular extension off of the bottom of the manifold defining an open port for connection of a vacuum hose 25 thereto. The vacuum hose 25 leads to a vacuum source (e.g., a central vacuum system, standalone vacuum unit).

Figure 2:
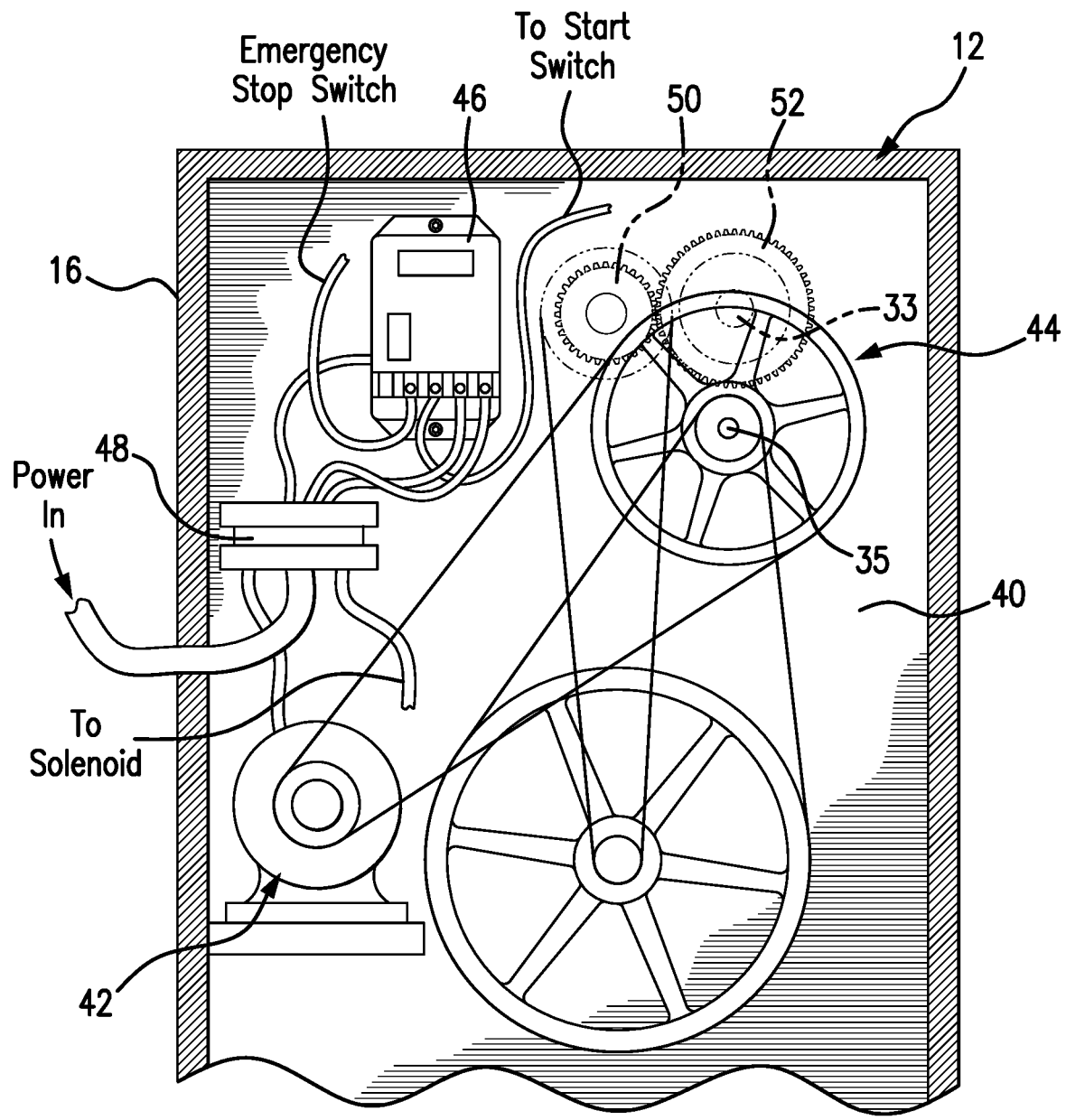
FIG. 2 is an isolated, cut-away view, in partial cross section, showing an interior power and control compartment within the housing of the machine and including an electric motor, a drive belt and reduction gear assembly, a timer and a definite purpose electrical contactor.

Referring to FIG. 2, an electric motor 42 and drive assembly is shown for rotating the feed roller 32 and brush roller 34. More particularly, a power and control housing 40 in the vertical housing portion 16 is shown and includes an electric motor 42 that drives an arrangement of belts and pulleys that are specifically sized and arranged to provide for a speed of rotation of the brush roller 34 that is significantly faster than the speed of rotation of the feed roller 32. More particularly, a drive belt and reduction gear assembly 44 is connected to the electric motor 42 and is specifically structured and arranged for rotating the axle 35 of the brush roller 34 at a higher RPM while also rotating the axle 33 of the feed roller at a speed that is significantly slower than the speed of rotation of the brush roller 34. The drive belt and reduction gear 44 further includes gears 50 and 52 that serve to change the direction of rotation of the feed roller 32 so that the feed roller 32 rotates in an opposite direction to the rotational direction of the brush roller 34. As seen, the first gear 50 is driven by one of the drive belts and intermeshes with the second gear 52 that drives rotation of the feed roller 32 and in a direction that is opposite to the rotational direction of the brush roller 34.

Figure 4:
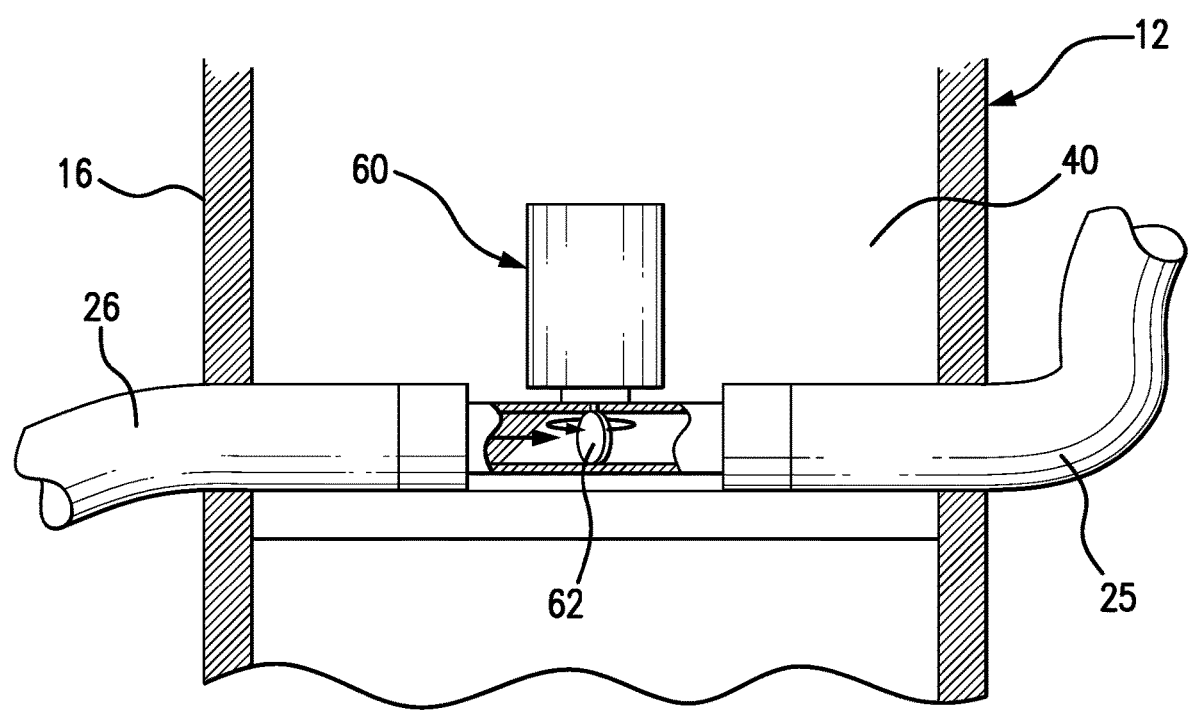
FIG. 4 is an isolated view, shown in cut-away, and in partial cross section, showing a solenoid-controlled gate valve installed inline along the vacuum hose line between the vacuum manifold and a connection to a central vacuum system.

The power and control housing 40 further contains a timer 46 that can be set to selected time length sequences of operation using dip switch controls. The timer 46 is electrically connected to the start switch 28 on the front of the machine, as well as the emergency stop switch 29. The timer 46 is further electrically connected to the motor 42 and a solenoid-controlled valve, as described more fully hereinafter. Power input to the unit comes through a definite purpose contactor 48. The timer is specifically structured for controlling operation of the electric motor 42 and the solenoid-controlled valve during the timed period of operation. Naturally, when the motor 42 is operational and running, the feed roller 32 and the brush roller 34 are drivingly rotated by the drive belt and reduction gear arrangement 44, as described above and shown in FIG. 2. At the end of the timed period of operation, as controlled by the timer 46, operation of the electric motor 42 is stopped which thereby stops rotation of the feed roller 32 and the brush roller 34. Simultaneously, power to the solenoid-controlled valve, as shown in FIG. 4, is interrupted to cause the solenoid to close the valve. Upon operation during the set timed period, power delivered to the solenoid-controlled valve causes the valve to open throughout the timed sequence of operation. At the end of the set time interval of operation, power to the solenoid-controlled valve is interrupted, thereby causing the solenoid-controlled valve to close.

As shown in FIG. 4, the solenoid-controlled valve 60 is installed inline with the vacuum hose leading from the vacuum manifold 36 to the central vacuum system at a car wash facility or other facility that has a central vacuum system. In particular, the inline installation of the solenoid-controlled valve is connected to the hose 25 leading from the vacuum manifold 36 and the hose 26 leading to the central vacuum system. The solenoid-controlled valve is contained within the housing 12 of the floor mat vacuum machine 10, preferably within the compartment 40, below the electric motor 42. As seen in FIG. 4, the electric solenoid 60 controls operation of gate valve 62 between an open and closed position. In a closed position, when the unit is not operational, the vacuum force from the central vacuum system is blocked and, therefore a suction force does not exist in the hose 25 leading to the vacuum manifold 36. Upon operation of the machine, usually by pressing the start button 28, the floor mat vacuum machine is operated throughout the timed interval, whereupon the solenoid 60 opens the gate valve 62 to allow the suction force to be drawn through the hose 25 and the vacuum manifold 36, creating a force of suction within the open top trough 37 of the vacuum manifold 36 throughout operation of the machine during the timed interval. Upon termination of the timed interval of operation of the floor mat vacuum machine 10, the solenoid 60 is de-energized and the gate valve 62 closes to stop the force of suction from continuing on through the hose 25 to the vacuum manifold 36 and thus the vacuum suction is effectively shut off.

Figure 5:
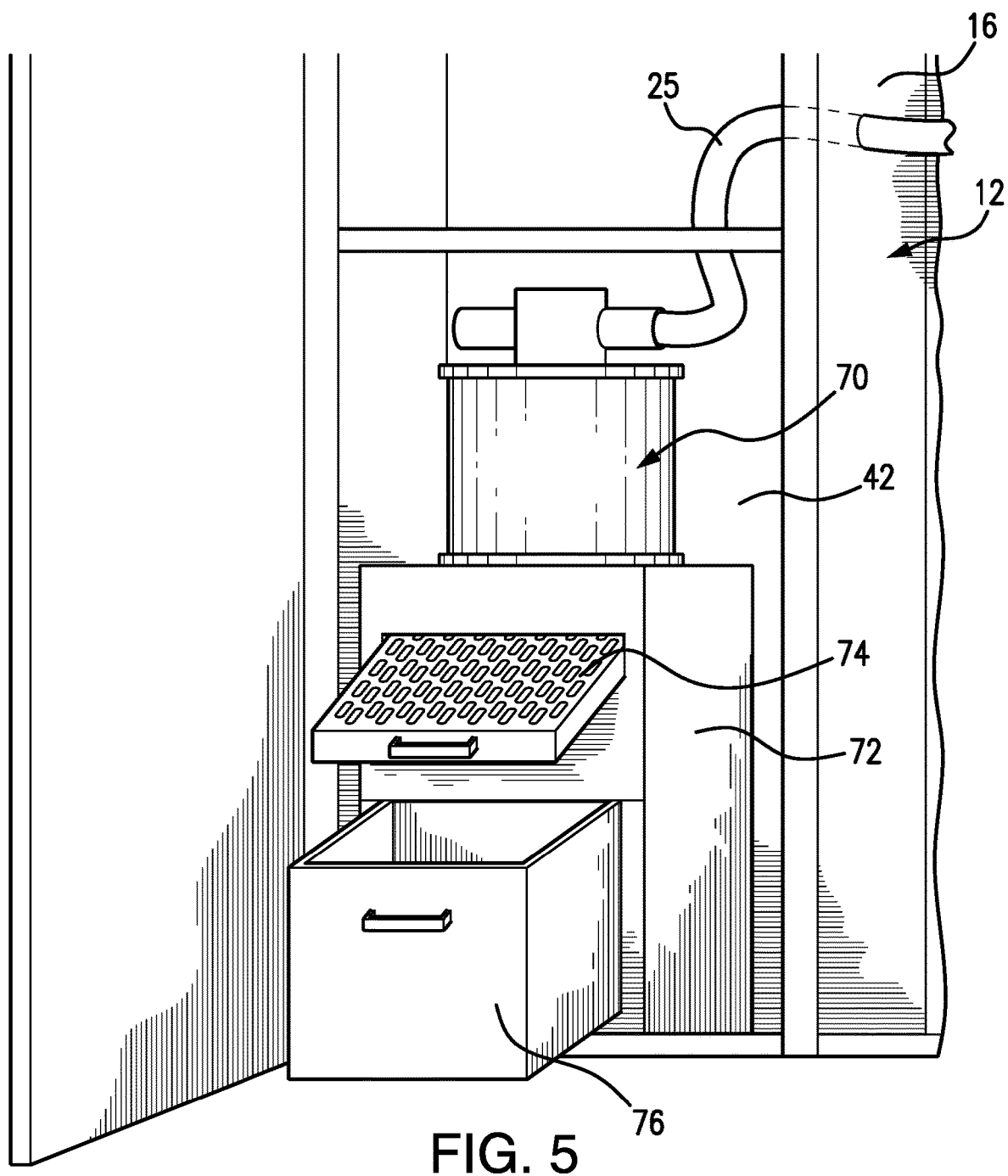
FIG. 5 is an isolated perspective view showing a standalone vacuum device installed within a lower compartment of the housing of the floor mat vacuum machine of the present invention for providing a vacuum suction force at the vacuum manifold of the machine according to another embodiment of the invention.

Referring to FIG. 5, an alternative embodiment of the vacuum source is shown for use in conjunction with the floor mat vacuum machine 10 of the present invention. Specifically, a self-contained vacuum unit 70 is installed within a lower compartment 42 of the vertical housing portion 16 and is connected to the vacuum hose 25 leading to the vacuum manifold 36 in the interior mat vacuum chamber 30. Upon operation of the floor mat vacuum machine 10 through the timed sequence of operation, as controlled by timer 46, power is provided to the self-contained vacuum unit 70 to energize and operate the vacuum unit 70 throughout the timed sequence, thereby creating the vacuum suction through the hose 25 and within the vacuum manifold 36, including the open trough 37 surrounding the brush roller 34. As seen in FIG. 5, the self-contained vacuum unit 70 includes a lower debris collection housing that may include a filter 74 as well as a drawer 76 or other container that can be removed to empty the collected dirt, sand, lint and other debris that is pulled through the vacuum system while vacuuming the floor mats. This particular embodiment is useful at a service station or other location that is not equipped with a central vacuum system.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A vehicle floor mat vacuum machine comprising:
    a housing structure including a first housing portion having an interior mat vacuum chamber and a second housing portion having a power and control compartment;
    the first housing portion including an elongate slot opening defining an open mouth for receiving a vehicle floor mat therethrough, and the open mouth communicating with the interior mat vacuum chamber;
    a rotatable feed roller within the interior mat vacuum chamber and having a central axle defining a longitudinal rotational axis of the feed roller;
    a vacuum manifold within the interior mat vacuum chamber and including an elongate trough having an open top surrounded by a top peripheral edge;
    a rotatable brush roller including a central axle defining a longitudinal rotational axis of the brush roller that is parallel to the longitudinal rotational axis of the feed roller, and the brush roller including an arrangement of bristles radiating out from the central axle and terminating at distal bristle ends, and the brush roller being rotatably supported within the elongate trough of the vacuum manifold so that the central axle is below the top peripheral edge of the vacuum manifold and the distal bristle ends extend above the top peripheral edge of the elongate trough, and the feed roller and the brush roller being supported and maintained in spaced relation, and in vertical alignment, to provide a gap between the feed roller and the brush roller for passage of the floor mat therethrough between the feed roller and the brush roller so that the feed roller engages one side of the vehicle floor mat and the brush roller engages an opposite carpet side of the vehicle floor mat;
    the vacuum manifold further including a vacuum connection port for connection to a vacuum source to provide a force of suction within the vacuum manifold, and throughout the open elongate trough;
    the vacuum manifold including a spaced arrangement of transverse bars extending across the open top of the elongate trough for discouraging the vehicle floor mat from being pulled down into the vacuum manifold by the force of suction within the vacuum manifold generated by the vacuum source;
    a drive assembly for drivingly rotating the brush roller and the feed roller; and
    a timer for controlling an operational period of time of the vehicle floor mat vacuum machine including start and stop of the drive assembly and initiation and termination of suction in the vacuum manifold created by the vacuum source, wherein rotation of the feed roller and the brush roller is simultaneously started with the initiation of suction in the vacuum manifold at the beginning of the operational period of time and rotation of the feed roller and the brush roller is simultaneously stopped with the termination of suction in the vacuum manifold at the end of the operational period of time.

2. The vehicle floor mat vacuum machine as in claim 1 wherein the vacuum source is a central vacuum system.

3. The vehicle floor mat vacuum machine as in claim 2 further comprising:
    a solenoid-controlled valve between the vacuum manifold and the central vacuum system and the solenoid-controlled valve being controlled by the timer, and the solenoid-controlled valve opening at the start of the operational period of time to provide suction in the vacuum manifold, and the solenoid-controlled valve closing at the end of the operational period of time to terminate suction in the vacuum manifold.

4. The vehicle floor mat vacuum machine as in claim 3 wherein the drive assembly includes an electric motor and an arrangement of drive belts and pulleys for rotating the feed roller at a first speed and for rotating the brush roller at a second speed that is faster than the first speed of rotation of the feed roller.

5. The vehicle floor mat vacuum machine as in claim 4 wherein the drive assembly further includes an arrangement of gears for rotating the feed roller in a direction of rotation that is opposite to a direction of rotation of the brush roller.

6. The vehicle floor mat vacuum machine as in claim 1 wherein the vacuum source is a vacuum unit contained within the housing structure.

7. A vehicle floor mat vacuum machine comprising:
    a housing structure including a first housing portion having an interior mat vacuum chamber and a second housing portion having a power and control compartment;
    the first housing portion including an elongate slot opening defining an open mouth for receiving a vehicle floor mat therethrough, and the open mouth communicating with the interior mat vacuum chamber;
    a rotatable feed roller within the interior mat vacuum chamber and having a central axle defining a longitudinal rotational axis of the feed roller;
    a vacuum manifold within the interior mat vacuum chamber and including an elongate trough having an open top surrounded by a top peripheral edge;

a rotatable brush roller including a central axle defining a longitudinal rotational axis of the brush roller that is parallel to the longitudinal rotational axis of the feed roller, and the brush roller including an arrangement of bristles radiating out from the central axle and terminating at distal bristle ends, and the brush roller being rotatably supported within the elongate trough of the vacuum manifold so that the central axle is below the top peripheral edge of the vacuum manifold and the distal bristle ends extend above the top peripheral edge of the elongate trough, and the feed roller and the brush roller being supported and maintained in spaced relation to provide a gap between the feed roller and the brush roller for passage of the floor mat therethrough between the feed roller and the brush roller so that the feed roller engages one side of the vehicle floor mat and the brush roller engages an opposite carpet side of the vehicle floor mat;

the vacuum manifold further including a vacuum connection port for connection to a vacuum source to provide a force of suction within the vacuum manifold, and throughout the open elongate trough;

the vacuum manifold including a spaced arrangement of transverse bars extending across the open top of the elongate trough for discouraging the vehicle floor mat from being pulled down into the vacuum manifold by the force of suction within the vacuum manifold generated by the vacuum source;

a drive assembly for drivingly rotating the brush roller and the feed roller including an electric motor and an arrangement of drive belts and pulleys for rotating the feed roller at a first speed and for rotating the brush roller at a second speed that is faster than the first speed of rotation of the feed roller; and a timer for controlling an operational period of time of the vehicle floor mat vacuum machine including start and stop of the drive assembly and initiation and termination of suction in the vacuum manifold created by the vacuum source, wherein rotation of the feed roller and the brush roller is simultaneously started with the initiation of suction in the vacuum manifold at the beginning of the operational period of time and rotation of the feed roller and the brush roller is simultaneously stopped with the termination of suction in the vacuum manifold at the end of the operational period of time.

8. The vehicle floor mat vacuum machine as in claim 7 wherein the vacuum source is a central vacuum system.

\* \* \* \* \*